United States Patent Office 3,524,660
Patented Aug. 18, 1970

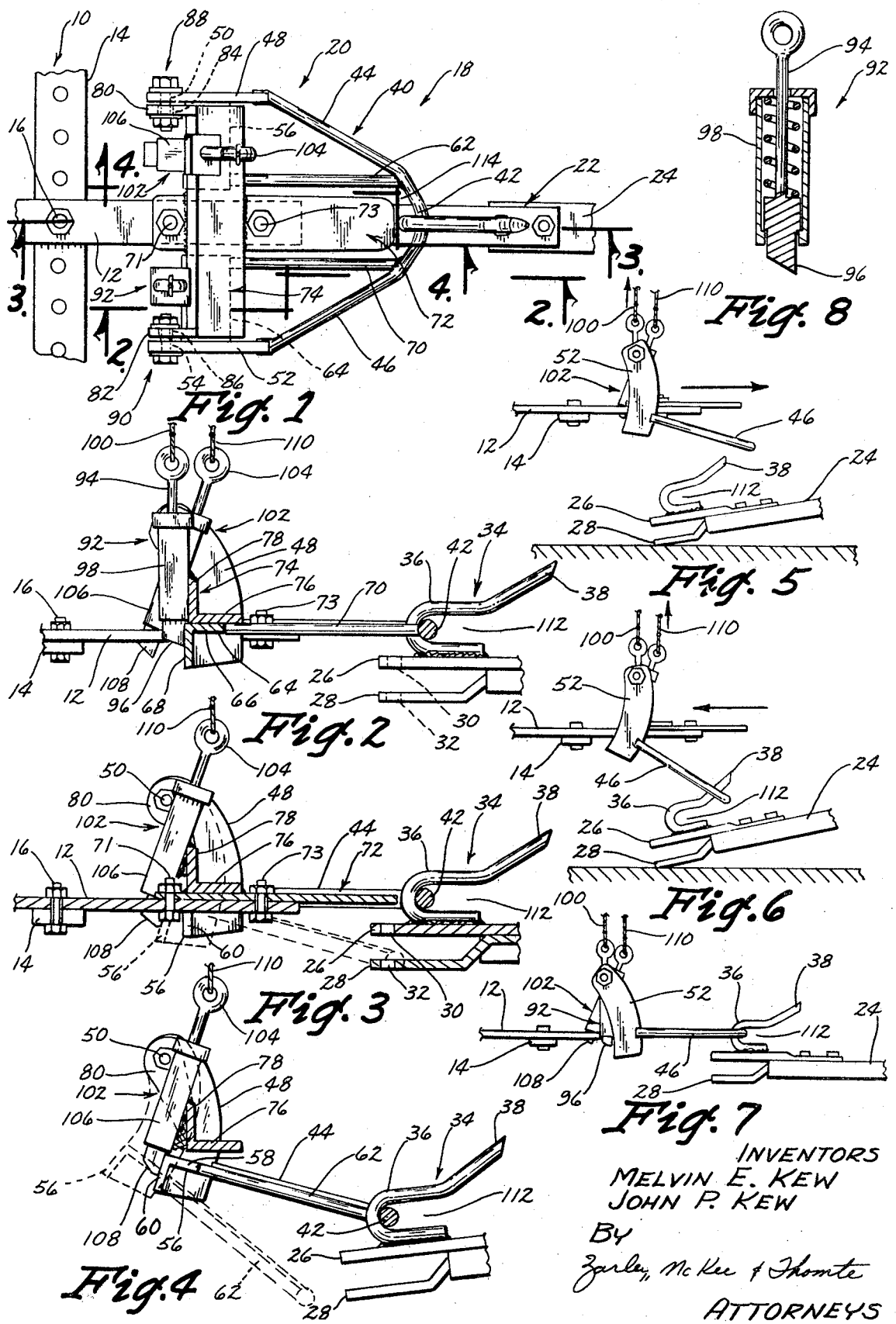

3,524,660
VEHICLE HITCH
Melvin E. Kew, R.R. 1, Box 111, and John P. Kew,
R.R. 1, Box 132, both of Sheffield, Iowa 50475
Filed Jan. 4, 1968, Ser. No. 695,722
Int. Cl. B60d 1/04
U.S. Cl. 280—478    10 Claims

ABSTRACT OF THE DISCLOSURE

A vehicle hitch for quickly connecting or disconnecting a driven vehicle such as a wagon or the like to a driving vehicle such as a tractor or the like without the operator leaving the tractor. The hitch includes a substantially U-shaped support which is pivotally secured about a horizontal axis to the tractor drawbar assembly or its equivalent. A pair of locking pins are operatively connected to the U-shaped support which maintains the support in a fully locked horizontal position and a half-locked inclined position respectively. When both of the locking pins are released, the support is freely pivotal with respect to the tractor hitch assembly and extends substantially vertically downwardly therefrom. A vertically disposed hook is secured to the tongue of the wagon and is adapted to be received by the U-shaped support at times to effect the connection of the tractor and the driven vehicle.

---

It is a time consuming, difficult and sometimes hazardous task to hitch a wagon or the like to a tractor. The operator must necessarily dismount from the tractor and attempt to align the tractor hitch assembly or drawbar assembly with the hitch of the wagon. When manual alignment is not possible, the operator must either remount the tractor or attempt to move the tractor by manipulating the clutch from the ground. A few vehicle hitches have been devised which attempted to solve the coupling problem but have been relatively unsuccessful. For example, U.S. Pat. No. 2,635,890 which was granted to Swartz discloses a vehicle hitch which apparently attempted to solve the coupling problem but which has several shortcomings. The Swartz device only permits satisfactory coupling when the wagon tongue is in a horizontal position. Additionally, the operator must pull on the latch cable during the disconnection operation which obviously detracts from the operator's control of the tractor. Further, the Swartz device is free to pivot with respect to the tractor hitch assembly at all times which causes a great amount of "play" to exist in the connection. Other hitches have been manufactured which utilize stands or supports secured to the wagon tongue. Such hitches have met with little success since the stands or supports do not satisfactorily function on certain types of terrains and ground conditions.

Therefore, it is a principal object of this invention to provide a vehicle hitch for quickly connecting and disconnecting a driven vehicle to a driving vehicle.

A further object of this invention is to provide a vehicle hitch which is strong enough so that any type of equipment may be pulled behind the tractor.

A further object of this invention is to provide a vehicle hitch which permits the connection of the tractor to the trailer when the trailer tongue is resting on the ground.

A further object of this invention is to provide a vehicle hitch which permits the connection of a tractor or the like to a pulled vehicle regardless of the ground conditions or terrain.

A further object of this invention is to provide a vehicle hitch which permits the connection of a wagon tongue or the like to the tractor without the necessity of "jerking" the tractor with respect to the pulled vehicle.

A further object of this invention is to provide a vehicle hitch which is adapted to be connected to a variety of different tractor drawbar and hitch assemblies.

A further object of this invention is to provide a vehicle hitch which permits the tractor or the like to move the trailer or the like in a rearward direction without inadvertent disconnection of the vehicles.

A further object of this invention is to provide a vehicle hitch which does not limit the turning ability or radius of the vehicles.

A further object of this invention is to provide a vehicle hitch which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the device with the tractor drawbar assembly and the wagon tongue being only partially shown, the broken lines indicating structure which would not ordinarily be seen;

FIG. 2 is a sectional view as seen along lines 2—2 of FIG. 1 illustrating the hitch in a horizontal locked position;

FIG. 3 is a sectional view as seen along lines 3—3 of FIG. 1 illustrating the hitch in a horizontal locked position, the broken lines indicating the position to which the U-shaped support pivots upon the release of one of the locking pins;

FIG. 4 is a sectional view as seen along lines 4—4 of FIG. 1 illustrating the hitch in a half-locked position, the broken lines indicating the position to which the support will pivot when the second locking pin is released;

FIG. 5 is a side view illustrating the hitch in a half-locked position and illustrating the hitch being moved rearwardly with respect to the wagon tongue during the first step in the connection operation;

FIG. 6 s a view similar to FIG. 5 except that both of the locking pins have been released and the hitch is being moved forwardly with respect to the tongue during the connection operation;

FIG. 7 is a side view similar to FIGS. 5 and 6 which illustrates the hitch in locked position; and FIG. 8 is a longitudinal sectional view of one of the locking pins of the hitch.

The tractor hitch assembly is generally designated by the reference numeral 10 and includes a drawbar 12 extending rearwardly from the tractor which is supported upon a drawbar support 14 and bolted thereto by a bolt 16. Hitch 10 is merely representative of one type of tractor hitch which may be used with this invention and it should be understood that the instant invention may be used with practically any type of tractor hitch which is available on the market.

The hitch of this invention is generally designated by the reference numeral 18 and includes a hitch portion 20 which is operatively secured to the drawbar 12 and a hitch portion 22 which is operatively connected to the tongue 24 of the wagon or the like. Tongue 24 includes spaced apart clevis elements 26 and 28 which are provided with openings 30 and 32 formed therein respectively adapted to receive a hitch pin extending therethrough if desired. Secured to the upper surface of clevis element 26 rearwardly of openings 30 is a hook element 34 having a substantially U-shaped portion 36 and an upwardly extending arm portion 38 as best illustrated in FIGS. 2–4. Hook element 34 may be secured to clevis element 26 by welding or any other convenient method. When hitch portion 20 is not being used, the wagon tongue 24 can be hooked to any conventional drawbar by simply extending the hitch pin through the opening 30, the drawbar and the opening 32 as it can be seen that hook element 34 will not interfere with the same and will also serve as a handle for lifting the tongue into its desired position.

Hitch portion 20 includes a substantially U-shaped rod 40 having a rearward end 42 and leg members 44 and 46 extending outwardly and rearwardly therefrom. An upstanding wing member 48 is secured to the rearward end of leg member 44 by welding or the like and has an opening 50 formed in its upper forward end. An upstanding wing member 52 is secured to the rearward end of leg member 46 by welding or the like and is provided with an opening 54 extending therethrough at its upper forward end. An angle member 56 is secured to the interior surface of wing member 48 and includes a horizontal portion 58 and a vertical portion 60 extending downwardly from the forward end therefrom as best illustrated in FIG. 4. A longitudinal rod 62 is secured to the inner forward end of angle 56 and extends rearwardly therefrom to the rearward end of leg member 44 to which it is welded. An angle 64 is secured to the interior surface of wing member 52 by welding or the like and includes a horizontal portion 66 and a vertical portion 68 extending downwardly from the forward end of horizontal portion 66 as best illustrated in FIG. 2. As seen in FIG. 1, the inner ends of angles 56 and 64 are spaced from each other to permit the drawbar 12 to be positioned therebetween. A longitudinal rod 70 is secured to the inner rearward end of angle 64 and extends rearwardly to the rearward end of leg member 46 to which it is secured by welding or the like.

A bar 72 is secured to the upper surface of drawbar 12 by bolts 71 and 73 as best illustrated in FIGS. 1 and 3. A transverse angle member 74 is secured to the upper surface of bar 72 by welding or the like and extends laterally outwardly therefrom at right angles as seen in FIG. 1. As seen in FIG. 1, the outer ends of angle member 74 are spaced slightly inwardly from the interior surfaces of wing members 48 and 52. Angle member 74 includes a horizontal portion 76 and a vertical portion 78 extending upwardly from the forward end thereof as best illustrated in FIG. 2. A pair of arms 80 and 82 are secured to the forward sides of the opposite ends of angle member 74 and extend upwardly and rearwardly therefrom. Arms 80 and 82 are provided with openings 84 and 86 formed therein which register with openings 50 and 54 in wings 48 and 52 respectively. A pivot pin assembly 88 pivotally connects the upper forward ends of wing member 48 and arm 80 while a pivot pin assembly 90 pivotally connects the upper forward ends of wing member 52 and arm 82 as illustrated in FIG. 1. It should be noted that the pivotal axis defined by pivot pin assemblies 88 and 90 is spaced above the horizontal plane of the drawbar 12 and the bar 72.

A locking pin means 92 is secured to the forward end of vertical portion 78 of angle member 74 by welding or the like. Locking pin means 92 includes a spring loaded plunger 94 having a lower end portion 96 which normally extends from the rearward end of the housing 98 but which will be retracted into housing 98 upon plunger 94 being pulled upwardly by means of the cable 100. As seen in FIGS. 1 and 2, locking pin means 92 is vertically disposed and is secured to angle member 74 inwardly of arm 82. A second locking pin means 102 is secured to the forward surface of vertical portion 78 of angle member 74 inwardly of arm 80. As seen in FIGS. 1 and 2, locking pin means 102 is angularly disposed with respect to locking pin means 92 and includes a spring loaded plunger 104 mounted in a housing 106. Plunger 104 includes a lower end portion 108 which normally extends from the lower end of housing 106 but which may be withdrawn into the interior of housing 106 upon plunger 104 being raised by means of cable 110. It should be noted that the lower end portion 96 of locking pin means 92 is in the pivotal path of vertical portion 68 of angle 64 while the lower end portion 108 of locking means 102 is in the pivotal path of vertical portion 60 of angle 56. When the rod 40 is in a horizontal position such as illustrated in FIG. 2, the lower end portion 96 of locking pin means 92 engages the forward side of vertical portion 68 of angle 64 to prevent the pivotal movement of the rod 40 with respect to the device. When locking pin means 92 has been pulled, assuming that bar 40 is not yet connected to the hitch portion 34, rod 40 will pivot downwardly with respect to bar 72 until the forward surface of vertical portion 60 of angle 56 engages the rearward end of lower end portion 108 of locking pin means 102. When both of the locking pin means have been pulled or released, the rod 40 is then free to pivot with respect to bar 72 to the position which is illustrated by broken lines in FIG. 4 inasmuch as neither of the lower end portions of the locking pin means will then be in the pivotal path of their respective angles 64 and 56.

The hitch portion 20 is connected to the hitch portion 22 in the following manner. Assuming that the locking pin means 92 has been pulled or released which is ordinarily the case since the locking pin means 92 would have been released during the last disconnection operation, the tractor is moved rearwardly with respect to the tongue 24 so that the rearward end 42 of bar 40 would be positioned rearwardly of the upper end of arm portion 38. Locking pin means 102 is then pulled so that the lower end portion 108 is moved out of the pivotal path of the vertical portion 60 of angle 56 so that the bar 40 may drop from the position illustrated in FIG. 5 to the position illustrated in FIG. 6 and by broken lines in FIG. 4. As rod 40 pivots with respect to the angle member 74 and bar 72, hook member 34 will be received between the longitudinal rods 62 and 70. The tractor is then moved forwardly with respect to the tongue which causes the rearward end 42 of rod 40 to enter the opening 112 defined by U-shaped portion 36 of hook member 34. The continued forward movement of the tractor will cause the rearward end 42 of bar 40 to engage the rearward end of the U-shaped portion 36 which will cause the tongue 24 to be not only pulled forwardly as the tractor moves but also to pull the tongue from its ground engaging position seen in FIG. 6 to the horizontal position seen in FIG. 7. It is not necessary to jerk the tractor to cause the tongue 24 to be raised to the position of FIG. 7 due to the fact that the pivotal connection of the rod 40 to the stationary portion of the hitch is at a point above the horizontal plane of the drawbar 12. When the tongue 24 has been pivoted to the position seen in FIG. 7, the lower end portion 96 of locking pin means 92 will be permitted to extend from the lower end of housing 98 to engage the forward surface of vertical portion 68 of angle 64. Such engagement of the lower end portion 96 with angle 64 prevents the pivotal movement of the rod 40 with respect to angle member 74 and bar 72 until such time as the plunger 94 on locking pin means 92 is again pulled. FIG. 2 illustrates the hitch portions 20 and 22 in their locked or connected relationship as does FIG. 1. The tractor may be backed or moved in a rearwardly direction during the time the tongue 24 is connected to the hitch due to the fact that the rearward end of the bar 72 will engage the forward end of the U-shaped portion 36 of hook member 34. It can be appreciated from FIG. 1 that the hitch of this invention permits the tractor to be turned very sharply with respect to the wagon tongue 24 since hook member 34 may move in the opening 114 which is defined by longitudinal rods 62 and 70, rearward end 42 of rod 40 and the rearward end of the bar 72.

The tractor is disconnected from the wagon by simply pulling the plunger 94 on the locking pin means 92 which causes the lower end portion 96 to be moved out of engagement with the vertical portion 68 of angle 64. The rod 40 is then free to pivotally move downwardly until angle 56 engages the lower end portion 108 of locking pin means 102. The tractor is then moved rearwardly which causes the rod 40 to pass out of the opening 112 and to pass along the under side of arm portion 38 of hook member 34 until the hook member 34 completely passes out of engagement with the rearward end 42 of rod 40. As soon as the hook member 34 has become disengaged with rod 40, the tongue 24 will drop to the ground and the relationship between rod 40 and tongue 24 at this time is also illustrated in FIG. 5. The tractor may then be moved forwardly with respect to the tongue 24 which will cause the rod 40 to pass over hook member 34 without engaging the same. The rod 40 would ordinarily be left in the position illustrated in FIG. 5 until such time as it was desired to connect the wagon to the tractor. If both of the locking pins have been pulled for one reason or another prior to the connection of the wagon to the tractor, the rod 40 is free to pivot rearwardly to pass over the hook member 34 as the tractor is being initially backed over the hitch portion 22. Once the rearward end 42 of rod 40 has completely passed rearwardly of hook member 34, the tractor can then be moved forwardly to effect the connection of the hitch portions.

It can be appreciated that the hitch portions can be satisfactorily connected even if the tractor is at an angle with respect to the tongue 24 due to the fact that the opening between the longitudinal rods 62 and 70 permits a substantial amount of latitude in this regard. It can also be appreciated that the hitch portions can be satisfactorily connected even though the tractor and/or the wagon is not on level ground due to the fact that hook member 34 will still enter the opening between the longitudinal rods 62 and 70. As previously stated, the hitch portion 18 is adapted for attachment to practically any type of drawbar arrangement which is presently available on existing tractors. It should be noted that the locking pin means 92 and 102 could be replaced by connecting individual hydraulic cylinders to the device to cause the pivotal movement of rod 40 with respect to the angle member 74. However, the locking pin arrangement shown in the drawings has proven to be the most satisfactory means for maintaining the hitch in a locked position while still limiting the downward pivotal movement of the rod 40 with respect to the angle member 74 and the bar 72.

Thus it can be seen that a unique vehicle hitch has been provided which permits the tractor or the like to be connected to the wagon or the like without the necessity of the operator leaving the tractor during either the connection or disconnection operation. Thus it can be seen that the device accomplishes at least all of its stated objectives.

Some changes may be made in the construction and arrangement of our vehicle hitch without departing from the real spirit and purpose of our invention, and it is our intention to cover by our claims, any modified forms of structure or use of mechanical equivalents which may be reasonably included within their scope.

We claim:

1. In a vehicle hitch,
a first hitch means adapted to be secured to a driving vehicle,
a second hitch means adapted to be secured to a driven vehicle, said second hitch means being adapted to be detachably secured to said first hitch means,
said first hitch means including a first member operative pivotally secured about a horizontal axis to said driving vehicle, said first member having means thereon adapted to detachably receive said second hitch means,
and control means operatively connected to said first member adapted to maintain said first member in various positions of its pivotal movement,
said driving vehicle having rearward and forward ends and including a rearwardly extending horizontal drawbar, said first hitch means including a bar secured to said drawbar in a parallel relationship thereto and having a rearward end spaced rearwardly of the rearward end of said drawbar, a cross member secured at its center to said bar and extending transversely with respect thereto, the opposite ends of said cross member being spaced outwardly on opposite sides of said drawbar, said first member being comprised of a substantially U-shaped rod having a rearward end and forwardly extending leg members, the forward ends of said leg members being operatively pivotally secured to said opposite ends of said cross member respectively, the rearward end of said rod being spaced rearwardly of the rearward end of said bar, said control means being connected to said U-shaped rod, said driven vehicle including a forwardly extending hitch member having an upper end, said second hitch means including a rearwardly extending hook means secured to the upper end of said hitch member, said hook means adapted to be received between the leg members of said U-shaped rod at times.

2. The vehicle hitch of claim 1 wherein a first stop means is operatively secured to the forward end of one of said leg members and extends downwardly therefrom, a second stop means operatively secured to the forward end of the other leg member and extending downwardly therefrom, a first locking means operatively secured to said cross member and having a movable portion in the pivotal path of said first stop means adapted to selectively maintain said U-shaped rod in a horizontal position at times, a second locking means operatively secured to said cross member and having a movable portion in the pivotal path of said second stop means adapted to selectively maintain said U-shaped rod in an inclined position at times.

3. The vehicle hitch of claim 2 wherein said U-shaped rod is freely piovtally movable when both of said first and second locking means have been activated to withdraw their movable portions out of the pivotal path of said stop means.

4. The vehicle hitch of claim 3 wherein said each of said locking means are comprised of a spring loaded plunger means.

5. The vehicle hitch of claim 1 wherein first and second wings are operatively secured to the forward ends of said leg members and extend upwardly therefrom, said cross member having first and second arms secured to its opposite ends respectively and extending upwardly therefrom, one of said arms and one of said wings being pivotally secured together adjacent their upper ends, the other of said arms and the other of said wings being pivotally secured together adjacent their upper ends.

6. In a vehicle hitch,
a first hitch means adapted to be secured to a driving vehicle,
a second hitch means adapted to be secured to a driven vehicle, said second hitch means being adapted to be detachably secured to said first hitch means,
said first hitch means including a first member operatively pivotally secured about a horizontal axis to said driving vehicle, said first member having means thereon adapted to detachably receive said second hitch means,
and control means operatively connected to said first member adapted to maintain said first member in various positions of its pivotal movement,
said control means including a first means adapted to maintain said first member in one position of its pivotal movement and a second means adapted to maintain said first member in a second position of its pivotal movement,
said first and second means being comprised of first and second locking pin means respectively in the pivotal path of said first member.

7. The vehicle hitch of claim 6 wherein said first and second locking pin means are angularly disposed with respect to each other, said first locking pin means selectively maintaining said first member in a substantially horizontal locked position, said second locking pin means selectively maintaining said first member in an inclined half-open position when said first locking pin means has been released.

8. In a vehicle hitch,
a first hitch means adapted to be secured to a driving vehicle,
a second hitch means adapted to be secured to a driven vehicle, said second hitch means being adapted to be detachably secured to said first hitch means,
said first hitch means including a first member operatively pivotally secured about a horizontal axis to said driving vehicle, said first member having means thereon adapted to detachably receive said second hitch means,
and control means operatively connected to said first member adapted to maintain said first member in various positions of its pivotal movement,
said driven vehicle including a tongue member having a clevis means at its free end, said second hitch means being mounted on the upper end of said tongue member and being spaced rearwardly from said clevis means.

9. In a vehicle hitch,
a first hitch means adapted to be secured to a driving vehicle,
a second hitch means adapted to be secured to a driven vehicle, said second hitch means being adapted to be detachably secured to said first hitch means,
said first hitch means including a first member operatively pivotally secured about a horizontal axis to said driving vehicle, said first member having means thereon adapted to detachably receive said second hitch means,
and control means operatively connected to said first member adapted to maintain said first member in various positions of its pivotal movement,
said driving vehicle having rearward and forward ends and including a rearwardly extending horizontal drawbar means, a cross member operatively secured at its center to said drawbar means and extending transversely with respect thereto, said first member being comprised of a substantially U-shaped rod having a rearward end and forwardly extending leg members, the forward ends of said leg members being operatively pivotally secured to the opposite ends of said cross member, the rearward end of said rod being spaced rearwardly of the rearward end of said drawbar means, said control means being operatively connected to said rod, said driven vehicle including a forwardly extending hitch member having an upper end, said second hitch means including a rearwardly extending hook means secured to the upper end of said hitch member, said hook means adapted to be received between the leg members of said rod at times.

10. In a vehicle hitch,
a first hitch means adapted to be secured to a driving vehicle,
a second hitch means adapted to be secured to a driven vehicle, said second hitch means being adapted to be detachably secured to said first hitch means,
said first hitch means including a first member operatively pivotally secured about a horizontal axis to said driving vehicle, said first member having means thereon adapted to detachably receive said second hitch means,
and control means operatively connected to said first member adapted to maintain said first member in various positions of its pivotal movement,
said control means including a locking pin means operatively connected to said first member adapted to maintain said first member in at least first and second positions of its pivotal movement, said first member being in a substantially horizontal position when in its said first position, said first member extending downwardly and rearwardly with respect to said driving vehicle when in its second position, said first member being freely pivotal with respect to said driving vehicle when said locking pin means is not maintaining said first member in either of its said first and second positions.

References Cited

UNITED STATES PATENTS

| | | | |
|---|---|---|---|
| 1,453,059 | 4/1923 | Blass | 280—478 |
| 2,320,168 | 5/1943 | Benjamin et al. | 280—479 |
| 2,685,456 | 8/1954 | Black | 280—478 |
| 2,725,243 | 11/1955 | Paulsen et al. | 280—478 |
| 2,749,145 | 6/1956 | O'Donnell | 280—478 |

LEO FRIAGLIA, Primary Examiner

U.S. Cl. X.R.

280—479